(12) United States Patent
Kinsburskiy et al.

(10) Patent No.: US 11,507,362 B1
(45) Date of Patent: Nov. 22, 2022

(54) SYSTEM AND METHOD FOR GENERATING A BINARY PATCH FILE FOR LIVE PATCHING OF AN APPLICATION

(71) Applicant: Virtuozzo International GmbH, Schaffhausen (CH)

(72) Inventors: Stanislav Kinsburskiy, Moscow (RU); Alexey Kobets, Seattle, WA (US); Eugene Kolomeetz, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 235 days.

(21) Appl. No.: 17/062,743

(22) Filed: Oct. 5, 2020

Related U.S. Application Data

(63) Continuation of application No. 16/178,068, filed on Nov. 1, 2018, now Pat. No. 10,795,659.

(60) Provisional application No. 62/580,611, filed on Nov. 2, 2017.

(51) Int. Cl.
*G06F 8/65* (2018.01)

(52) U.S. Cl.
CPC .................................... *G06F 8/65* (2013.01)

(58) Field of Classification Search
CPC ......................................................... G06F 8/65
See application file for complete search history.

(56) References Cited

U.S. PATENT DOCUMENTS

| | | | | |
|---|---|---|---|---|
| 5,822,787 A * | 10/1998 | Zucker | ................ | G06F 12/1009 712/217 |
| 8,468,516 B1 * | 6/2013 | Chen | ...................... | G06F 8/656 717/169 |
| 9,483,256 B2 * | 11/2016 | Brar | ........................ | G06F 8/658 |
| 9,626,180 B2 * | 4/2017 | Barrat | .................... | G06F 9/5077 |
| 9,696,989 B1 * | 7/2017 | Korotaev | ............ | G06F 16/2228 |

(Continued)

FOREIGN PATENT DOCUMENTS

IN  201827048723 A * 7/2019 .......... G06F 11/3612

OTHER PUBLICATIONS

Zhang et al., "Adaptive Kernel Live Patching: An Open Collaborative Effort to Ameliorate Android N-day Root Exploits", Aug. 2016, Blackhat.com (Year: 2016).*

(Continued)

*Primary Examiner* — Wei Y Zhen
*Assistant Examiner* — Junchun Wu
(74) *Attorney, Agent, or Firm* — ArentFox Schiff LLP; Michael Fainberg

(57) ABSTRACT

A system and method for executing a method generating a binary patch file for live patching of an application is disclosed. In one exemplary aspect, the method comprises creating shared object by compiling source code patch file that contains source code of a new function corresponding to an old function, a global external symbol referenced in the source code of the new function, and at least one link to a symbol in an application binary code corresponding to the global external symbol, wherein the shared object contains binary code of the new function for replacing the old function during the live patching, and the result of a compilation of the link, generating metadata usable to facilitate the live patching, creating bindings between calculated relative addresses and the global external symbol referenced by the shared object, and creating the binary patch file by adding metadata to the shared object.

21 Claims, 8 Drawing Sheets

(56) References Cited

U.S. PATENT DOCUMENTS

| | | | | |
|---|---|---|---|---|
| 2005/0010911 A1* | 1/2005 | Kim | ............................ | G06F 8/54 |
| | | | | 717/162 |
| 2006/0080680 A1* | 4/2006 | Anwar | ................ | G06F 9/44547 |
| | | | | 719/328 |
| 2010/0083224 A1* | 4/2010 | Arnold | .................... | G06F 8/656 |
| | | | | 717/110 |
| 2013/0104119 A1* | 4/2013 | Matsuo | ...................... | G06F 8/65 |
| | | | | 717/173 |
| 2015/0040112 A1* | 2/2015 | Valencia | ................... | G06F 8/36 |
| | | | | 717/168 |
| 2018/0032721 A1* | 2/2018 | De | ....................... | G06F 12/1009 |
| 2018/0143820 A1* | 5/2018 | Banford | .................... | G06F 8/65 |
| 2018/0349289 A1* | 12/2018 | Wang | ................... | G06F 9/44521 |

OTHER PUBLICATIONS

Giuffrida et al., "Cooperative Update: A New Model for Dependable Live Update", Oct. 2009, ACM (Year: 2009).*

Jeong et al., "Functional Level Hot-patching Platform for Executable and Linkable Format Binaries", 2017, IEEE (Year: 2017).*

Chen et al., "Live Updating Operating Systems Using Virtualization", Jun. 2006, ACM (Year: 2006).*

Chen et al., "POLUS: A POwerful Live Updating System", 2007, IEEE (Year: 2007).*

* cited by examiner

SYSTEM AND METHOD FOR GENERATING A BINARY PATCH FILE FOR LIVE PATCHING OF AN APPLICATION

CROSS-REFERENCE TO RELATED APPLICATIONS

This application is a continuation of and claims the benefit of priority to U.S. Pat. application Ser. No. 16/178,068, filed on Nov. 1, 2018, which claims the benefit of priority to U.S. Provisional Patent Application Ser. No. 62/580,611 filed Nov. 2, 2017 entitled "System and Method for User space Live Patching", which are herein incorporated by reference in their entirety.

FIELD OF TECHNOLOGY

The present disclosure relates generally to the field of applying software updates and, more specifically, to systems and methods for generating a binary patch file for live patching of an application.

BACKGROUND

Many software applications run continuously on servers and are generally not stopped, or killed, unless maintenance is required. For example, services such as web servers, application servers and databases are continuously waiting for requests in order to support websites, applications, services and the like. Shutting the software applications down (e.g., killing their executing processes), even for maintenance, is generally undesirable as there may be external services relying on these applications running continuously. In some instances, critical updates, such as security updates, must be applied immediately, or as soon as possible. This leads to administrators waiting until low usage periods of time when the application can be shut down for patching, or a live software patch can be applied.

However, existing solutions for patching running processes, referred to as live patching, operate at the kernel level and can only change running processes in kernel space. These solutions do not run in user space (referring to memory address space outside of kernel space). The available solutions are also functionally limited because they are bound to only a single CPU architecture as they rely on comparisons of binary (or assembler) code of two versions of the program (the old and the new version). The task of comparing binary (or assembler) code is complex and differs entirely across different computer architectures, therefore the various solutions are generally bound to a single architecture. Further, for these solutions to create patch code, the old code of the application being updated and the new code must be compiled in the same way, in some cases with precisely the same compiler options and the same compiler version. This makes developing live patch code increasingly difficult to perform, maintain and modify, and even still does not work in user space.

Therefore, there is a need in the art for a system and method for generating a patch file usable for live patching processes, such that the patching is architecturally agnostic and is easy to develop and maintain.

SUMMARY

A system and method is disclosed herein for generating a binary patch file for live patching of an application.

In one aspect, the disclosure provides a method for generating a binary patch file for live patching of an application, the method comprising: creating a shared object by compiling a source code patch file, wherein the source code patch file contains source code of at least one new function corresponding to at least one old function in an application binary code, at least one global external symbol referenced in the source code of the at least one new function, and at least one link to at least one symbol in the application binary code corresponding to the at least one global external symbol, wherein the at least one link contains information about at least one definition of the at least one symbol in the application binary code, wherein, the shared object contains binary code of the at least one new function usable to replace the at least one old function during the live patching of the application, and the result of a compilation of the at least one link, wherein the results include binary data describing the at least one definition of the at least one symbol; generating metadata, usable to facilitate the live patching of the application, by calculating a relative address for each of the at least one symbol in the application binary code, using debug information of the application binary code, and using the binary data describing the at least one definition of the at least one symbol; in metadata, creating bindings between the calculated relative addresses and the at least one global external symbol referenced by the shared object; and creating the binary patch file by adding metadata to the shared object.

In one aspect, a symbol of the at least one global external symbol or the at least one symbol in the application binary code comprises a variable or a function.

In one aspect, the shared object references the at least one global external symbol.

In one aspect, the compilation of the at least one link is performed by invoking a compiler to compile the source code of the at least one new function to create an executable file.

In one aspect, the usage of the debug information of the application binary code comprises: verifying types and sizes of symbols in the source code patch file and the binary patch file.

In one aspect, the creating of the binary patch file comprises: receiving a list of architectures using the application; and generating, for each architecture in the list, a patch for the application.

In one aspect, the created binary patch file is usable in user space.

In one aspect, the disclosure provides a system for generating a binary patch file for live patching of an application, the system comprising: a combination of one or more processors configured to create a shared object by compiling a source code patch file, wherein the source code patch file contains source code of at least one new function corresponding to at least one old function in an application binary code, at least one global external symbol referenced in the source code of the at least one new function, and at least one link to at least one symbol in the application binary code corresponding to the at least one global external symbol, wherein the at least one link contains information about at least one definition of the at least one symbol in the application binary code, wherein, the shared object contains binary code of the at least one new function usable to replace the at least one old function during the live patching of the application, and the result of a compilation of the at least one link, wherein the results include binary data describing the at least one definition of the at least one symbol; generate metadata, usable to facilitate the live patching of the application, by calculating a relative address for each of the at least one symbol in the application binary code, using debug information of the application binary code, and using the binary data describing the at least one definition of the at least one symbol; in metadata, create bindings between the calculated relative addresses and the at least one global external symbol referenced by the shared object; and create the binary patch file by adding metadata to the shared object; and a patcher configured to use the created binary patch file for the live patching.

In another aspect, the disclosure provides a non-transitory computer-readable medium storing therein instructions for executing a method for generating a binary patch file for live patching of an application, the instructions comprising instructions for creating a shared object by compiling a source code patch file, wherein the source code patch file contains source code of at least one new function corresponding to at least one old function in an application binary code, at least one global external symbol referenced in the source code of the at least one new function, and at least one link to at least one symbol in the application binary code corresponding to the at least one global external symbol, wherein the at least one link contains information about at least one definition of the at least one symbol in the application binary code, wherein, the shared object contains binary code of the at least one new function usable to replace the at least one old function during the live patching of the application, and the result of a compilation of the at least one link, wherein the results include binary data describing the at least one definition of the at least one symbol; generating metadata, usable to facilitate the live patching of the application, by calculating a relative address for each of the at least one symbol in the application binary code, using debug information of the application binary code, and using the binary data describing the at least one definition of the at least one symbol; in metadata, creating bindings between the calculated relative addresses and the at least one global external symbol referenced by the shared object; and creating the binary patch file by adding metadata to the shared object.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. o the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for generating a binary patch file for live patching processes in user space. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
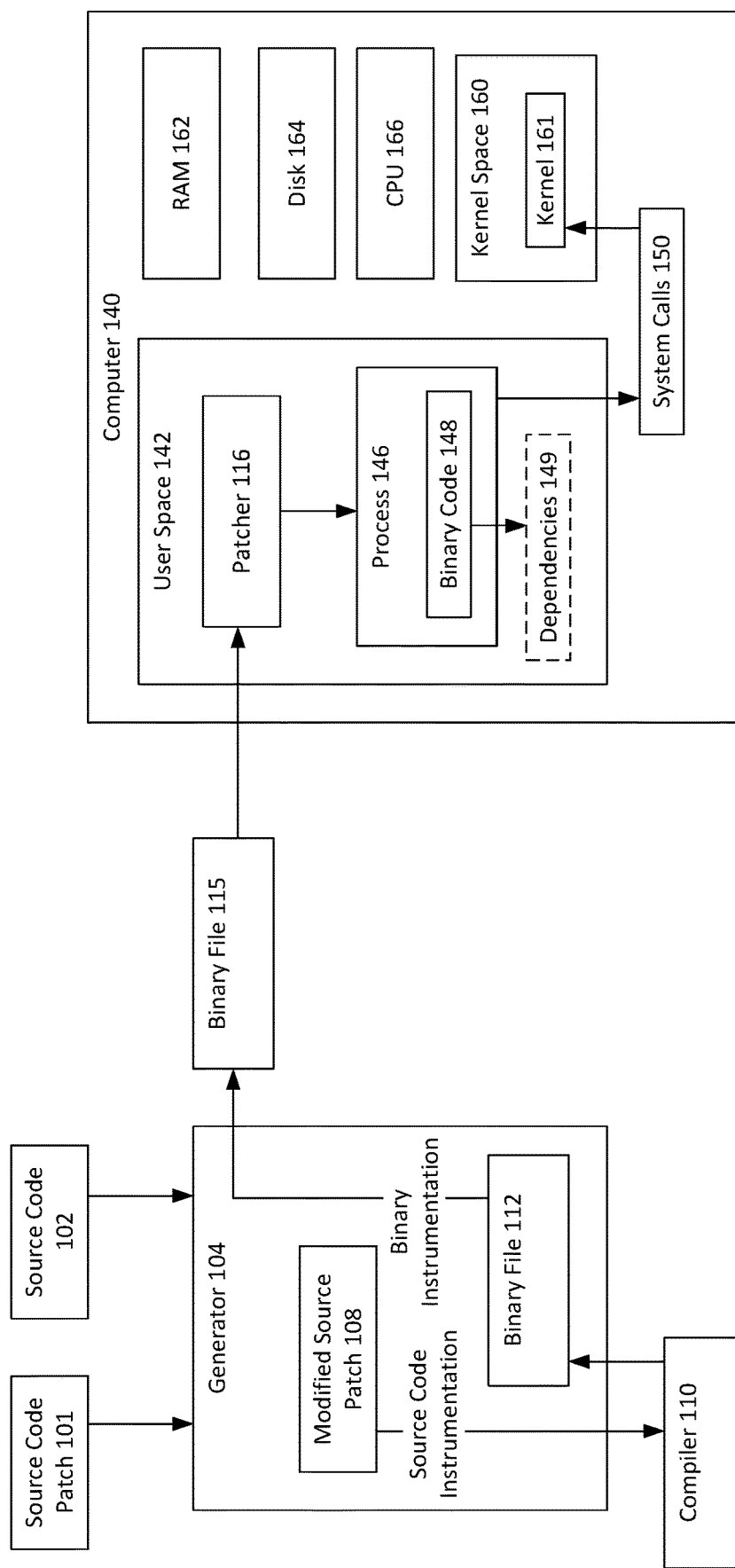
FIG. 1 illustrates a block diagram of a system for live patching processes in accordance with aspects of the present disclosure.

FIG. 1 illustrates a block diagram of a system 100 for live patching processes in accordance with aspects of the present disclosure.

The system 100 may comprise a generator 104, a patcher 116 and a computer 140. According to some aspects, the system 100 may only include patcher 116 and the computer 140. In one aspect, the generator 104 may be executed on a different computer system than computer 140 while in other aspects, the generator 104 may execute on computer 140. In one aspect, the patcher 116 and the generator 104 may execute on entirely different computers than each other, patcher 116 executing on computer 140. In another aspect, the patcher 116 may comprise a plurality of components, whereas at least one component or process of the patcher 116 is executed on computer 140. In some aspects, the system 100 may be comprised of the patcher 116 executing at least one process on the computer 140, the generator 104, or both.

The system 100 (which contains at least the components of the patcher 116 components working on the computer 140) patches an application (i.e., process 146) that is running on computer 140 using a patch (i.e., a binary file 115) generated by generator 104 and then applies the patch using patcher 116. The patcher 116 may integrate the binary file 115 into address space of the process 146, thereby patching the process 146 without killing the process 146. Accordingly, the amount of downtime for the computer 140 is minimized or eliminated entirely because the patch is performed "live". The binary file 115 is a binary file that contains compiled code and data used by the code. According to exemplary aspects of the present disclosure, the binary file 115 can be in any format, depending on the OS in which the process 146 runs. For example, the binary file 115 can be a Portable Executable (PE) file, an Executable and Linkable Format (ELF) file, Mach-O file, or the like. In some aspects, the binary file 115 is a dynamically loaded library (or a shared object), i.e. a file containing executable binary code, that can be loaded to a process and one or more portions of the binary file 115 can be executed in the process.

In one aspect, the computer 140 may contains system memory divided into two regions: user space 142 and kernel space 160. The kernel space 160 is where the kernel of the operating system executes and provides kernel-level services such as controlling the RAM 162 and the disk 164. The user space 142 is the set of memory locations in which user processes run, i.e., the memory not occupied by the kernel space. The user space 142 is generally where user applications and processes are executed, or the address space that is not the kernel, or processes running in non-privileged mode.

In some aspects of the disclosure, the computer may execute a process 146, which may access the kernel space 160 by making a system call 150. At the beginning, the process 146 (corresponding to the application that is being patched) is executing binary code 148 of the initial (unpatched) version of an application, or in other words the computer 140 executes an executable file of the non-patched version of the application.

In other aspects of the disclosure, the process 146 may be executed within a container or a virtual machine. The container is an isolated execution environment for processes. The operating system of the computer 140 may comprise a plurality of containers.

In some aspects, the generator 104 generates the binary file 115 (alternatively referred to as the patch throughout the disclosure). In some other aspects, the system 100 does not contain a generator and the patcher 116 works with a binary patch (e.g., binary file 115), which was generated like following, or which has the similar characteristics as the binary file generated in a way described below. A source code patch 101 is provided to the generator 104. The source code patch 101 may be a set of files that contain source code identifying a difference between an unpatched version of the application and a patched version of the application that is executing in process 146. The source code patch 101 may be generally written using a high-level compiled programming language such as C or C++, though there is no limitation to the language that is contemplated in this disclosure. In one aspect, the source code patch may be a "patch series" as used in LINUX.

According to one aspect, the generator 104 may also be provided source code 102 of the unpatched application currently executing in process 146 on computer 140. In another aspect, the generator 104 may be provided the unpatched version of the application source code and the patched versions of the application source code. Subsequently, the generator 104 creates the source code patch 101.

According to an exemplary aspect, the generator 104 determines that particular functions are modified or particular variables are accessed by functions in the source code patch 101. The generator 104 then may move all effected functions to a new file, the modified source patch 108. In some aspects, the modified source patch 108 or even binary file 112 can be input to the generator 104 instead of 101 and 102. However, this modified source patch 108 cannot be compiled yet because there may be references to symbols (i.e., variables, functions, etc.), which are not defined in the modified source patch 108.

Accordingly, the generator 104 further may perform a source code instrumentation (first instrumentation) by modifying the modified source patch 108. The first instrumentation comprises marking a portion of the symbols used in the modified source patch 108, but not defined in the modified source patch 108, as being defined in a location outside of the modified source patch 108, for example by marking the symbols as "global" and/or "external". The marking of a portion of the symbols may be performed for those symbols that were defined in the source code 102 and for symbols that are imported from library dependencies. In one aspect, marks (e.g., like "global" and "external") also indicate that the symbols are declared outside of any particular block (e.g., any particular function) so they are available to several functions in the software. In some aspects, macros can be used to perform the source patch instrumentation.

The generator 104 may then invoke compiler 110 (or a similar component able to create binary code) to compile the modified source patch 108 (with source code instrumentation) to generate a binary file 112 (e.g., a shared object file).

Figure 6:
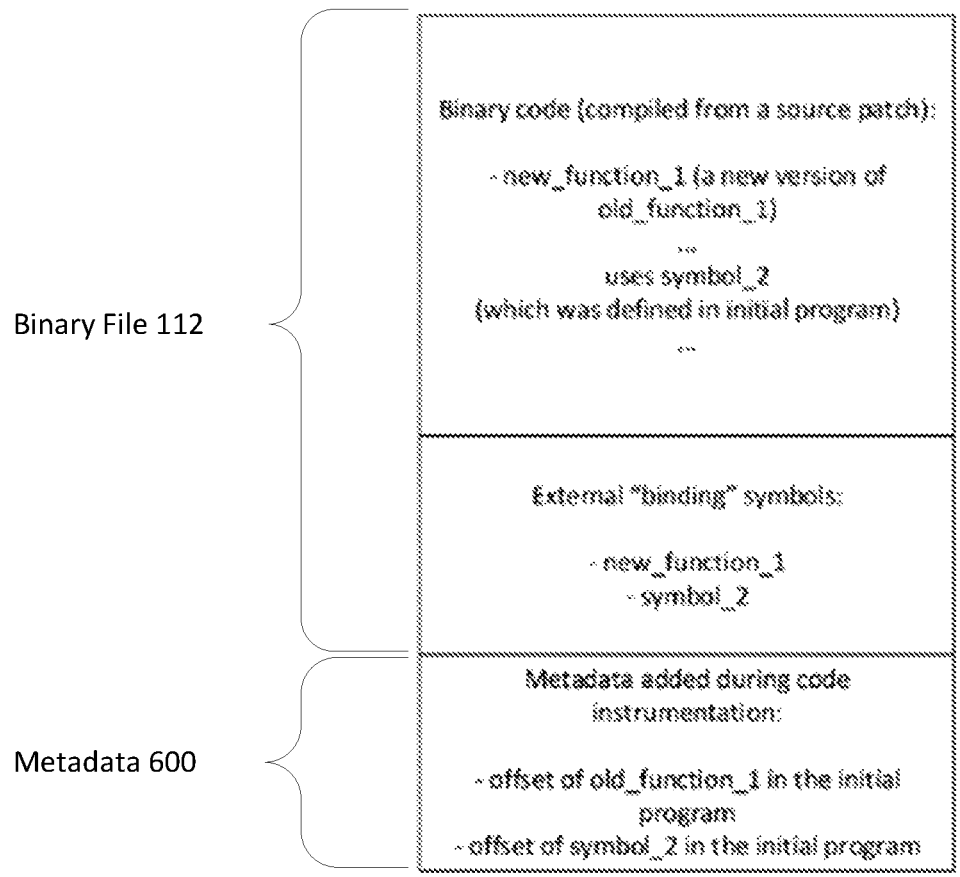
FIG. 6 is a block diagram illustrating portions of the executable file in accordance with an aspect of the disclosure.

After the binary file 112 is generated (or alternatively, when generator 104 receives binary file 112), the generator 104 performs a binary instrumentation (second instrumentation) step to include metadata (also referred to as binary instrumentation) to the binary file 112, thereby producing binary file 115, wherein the binary file 115 is alternatively referred to as a binary patch file or simply a patch, as shown in FIG. 6. According to one aspect, the instrumentation information comprises metadata that contains offsets of a portion of the symbols identified in the first instrumentation step by the generator 104, i.e., "binding" symbols which are symbols from the original application also used in the patch. In one aspect, the metadata is written to a new section of the binary file 112. In another aspect, the metadata is written to an existing section of the binary file 112, (e.g., to the Global Offset Table of the shared object, to Import or Relocation section of a PE file, or the like).

In one aspect, the offset of the symbol is constant and does not depend on how the binary file (e.g., binary file corresponding to the binary code 148) has been loaded to the process address space and in which address range. The offset of a symbol can be calculated from any predetermined place in the code. For example, if offsets are calculated from a base load address of the binary (e.g., binary code 148), then the real address of a symbol will be the base load address of the binary code plus the offset. For example, if the offsets are calculated from the first address in the target VMA, then the real address of a symbol will be the first address in target VMA plus the offset. The offsets value depend on how the binary has been built (by a compiler or linker), so the offsets can be computed without loading the binary to any process.

In some aspects, the metadata that will be included in the binary file 115 also contains metadata about locations (in the old version of binary code) of the functions that should be replaced by corresponding functions of the patch. In other words, metadata may contain offsets to the old versions of functions in the old (un-patched) binary code.

In some aspects, the generator 104 uses the binary code of the application (that should be patched) to create the metadata (i.e., to calculate offsets),In other aspects, the generator 104 uses debug information (e.g., debugging symbols, or any kind of information provided by the compiler for the debugger) corresponding to the binary code of the application (that should be patched) to create the metadata (i.e., to get offsets). Usually debug information contain at least some of the offsets that are needed to create the metadata. Sanity checks can be performed using the debug information, discussed further below.

In some aspects, the generator 104 may perform sanity checks, comprising checking the types and sizes of symbols in the source code patch 101 and the binary file 112 to determine whether the source code instrumentation was performed properly. In one aspect, the generator 104 may analyze whether the instrumentation was performed correctly by, for example, verifying types and sizes of symbols. This helps to avoid errors in compilation and also to bind contexts of the process 146 and the later-generated binary file 115, discussed below.

In this manner, the generator 104 is platform agnostic, i.e., the generator 104 is independent of the architecture of computer 140. The generator 104 can create patches for different architectures, e.g., x86 based systems or x64, arm, MIPS, S390, PPC64, aarch64 systems and the like. The generator 104 may, in one aspect, generate a patch for the same program or application for different platforms, given some options of the generator 104 and the compiler 110.

In some aspects, the generator 104 does not create binary file 112, but merely includes service information (i.e., metadata) with the binary file 112 needed to apply the patch.

Now, patcher 116 may patch the application executing in process 146 using binary file 115. In one aspect, the patcher 116 may execute in user space 142. In another aspect, the patcher 116 may comprise various components where a portion of the components of the patcher 116 execute on a different computer than computer 140, over a network, or the like, but at least one of the components is executed in a process executing on computer 140. In this aspect, a plugin may be used to create a socket on the computer 140 using a library and to send information or commands to the patcher 116 executing in a process on the computer 140 from a portion of the components of the patcher 116 located remotely. The plugin (or a component of the patcher working on the computer 140) is able to map and un-map a patch or may even send a list of shared objects needed for executing the code from the patch to the computer 140. The patcher 116 may comprise an applier component and a symbol resolver component and may be a program or a set of programs that applies the patch to the application.

Figure 2:
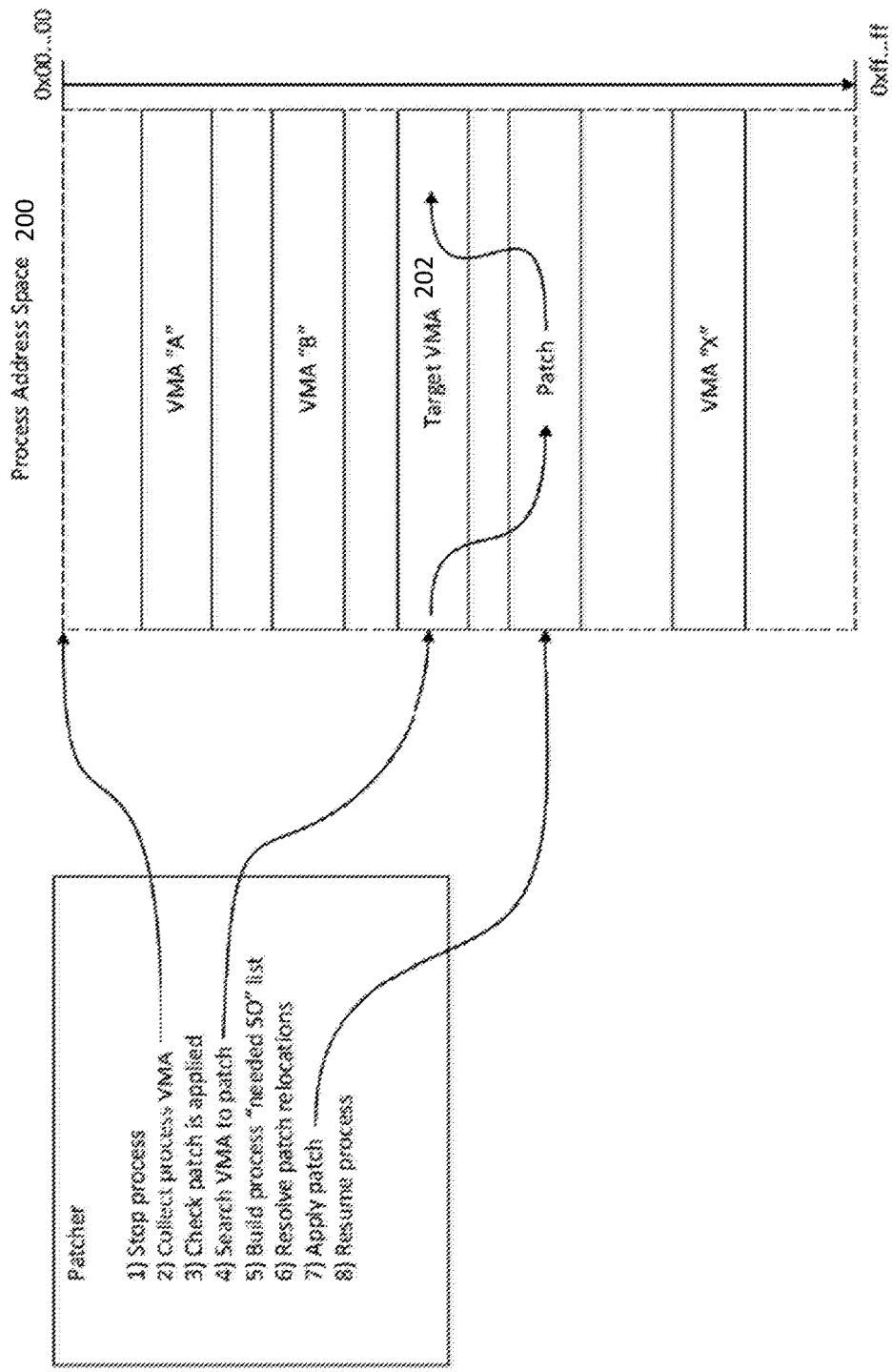
FIG. 2 illustrates the address space of a process being patched, in accordance with aspects of the present disclosure.

According to one aspect, the patcher 116 may first stop the execution of process 146 as shown in FIG. 2. The process address space 200 may comprise many different virtual memory areas (VMAs) such as "A", "B", and "X". Each VMA is a contiguous range of addresses that the process can use. The VMAs are areas in the process address space 200 where, for example, executable code or data is loaded. E.g., a VMA may correspond to a file mapping containing binary code 148 of the process. In this disclosure, binary code 148 implies executable code executing in the process and associated data. The target VMA to be patched (i.e., an address range which contains the code that should be changed/replaced by code from the binary patch) is, in this example, determined to be target VMA 202. The patcher 116 temporarily stops the process 146 and collects the VMA (or any of its analogs, depending on the OS in which the process 146 runs) for the process 146. In one aspect of the disclosure, stopping the process is achieved using the "ptrace" interface, which, in some aspects, sends a SIGTRAP signal to the process 146. The patcher 116 determines whether the patch has been applied, and if not, searches for and finds the target VMA 202. In one aspect, determining whether a patch has been applied comprises determining which patches have already been applied (e.g., the patcher can store information about applied patches), or searching and analyzing the virtual address space of the process 146 to find the functions that were patched or may need patching. The patcher 116 then builds a list of needed shared objects, e.g., to identify symbols exported by which shared objects should be resolved in the patch.

In this aspect, the patcher 116 resolves the symbols in the patch by identifying where the binary code 148 has been loaded in the address space of the process 146 (e.g., by identifying the base load address of binary code 148, or the first address in the target VMA 202, depending on implementation). The patcher 116 adds the offset (for each respective symbol) stored in the metadata of binary file 115 to the identified address to obtain the address of each symbol.

The patcher 116 finds free space in the address space 200 of process 146 and injects parasite code to address space 200 (e.g., writes a set of instructions belonging to parasite code, writes a set of instructions that map parasite code, and transfers control to the written instructions, or any other suitable method). The parasite code is binary code that is injected into process 146, and in turn, the binary code injects code of the patch by loading one or more portions of the binary code from the binary file 115 into free space of the process address space 200. In one aspect, the parasite code maps one or more portions (or the entire contents) of the binary file 115 into the address space 200 or reading contents of the binary file 115 and writing one or more portions of the contents into the address space 200. In one aspect, the one or more portions of the binary file 115 include the compiled functions (e.g., those that were contained in the modified source patch 108 and modified and compiled by the generator 104), while in other aspects the one or more portions also include the metadata (e.g., those created during the second instrumentation step performed by the generator 104). For example, when the metadata information is written to a separate section of the binary file 115, the one or more portions is also loaded. In some aspects, the patcher 116 then modifies the binary code 148 so that the old function of the application, contained in binary code 148, transfers control to the new function, contained in the instructions from the binary file 115. In some aspects, the patcher 116 may modify the old function by inserting jump instruction (or any other instruction responsible for transferring control/changing flow of control; conditional jump, call, enter, etc.) in the old function to jump to the new function. In another aspect, jump instructions may be inserted from the new function back to the old function. In other aspects, the patcher 116 inserts a call instruction to the new function in the old functions. Accordingly, when the old functions are called, control is transferred to the new function. In other aspects, other transfer of control methods are used. At this point, the binary patch has been loaded into the address space 200, symbols have been resolved and control transfers have been made from old functions to new functions. The patcher 116 subsequently resumes the process 146. In one aspect, the process is resumed by the patcher 116 performing a system call to kernel 161 to resume the suspended process 146. At completion, the process 146 is executing a patched version of the application while little to no downtime has been experienced by users of the computer 140. While the code being executed in process 146 on computer 140 is not the same as the code of the new version of the application, the behavior of the code being executed and the new version of the application is equivalent.

Figure 3:
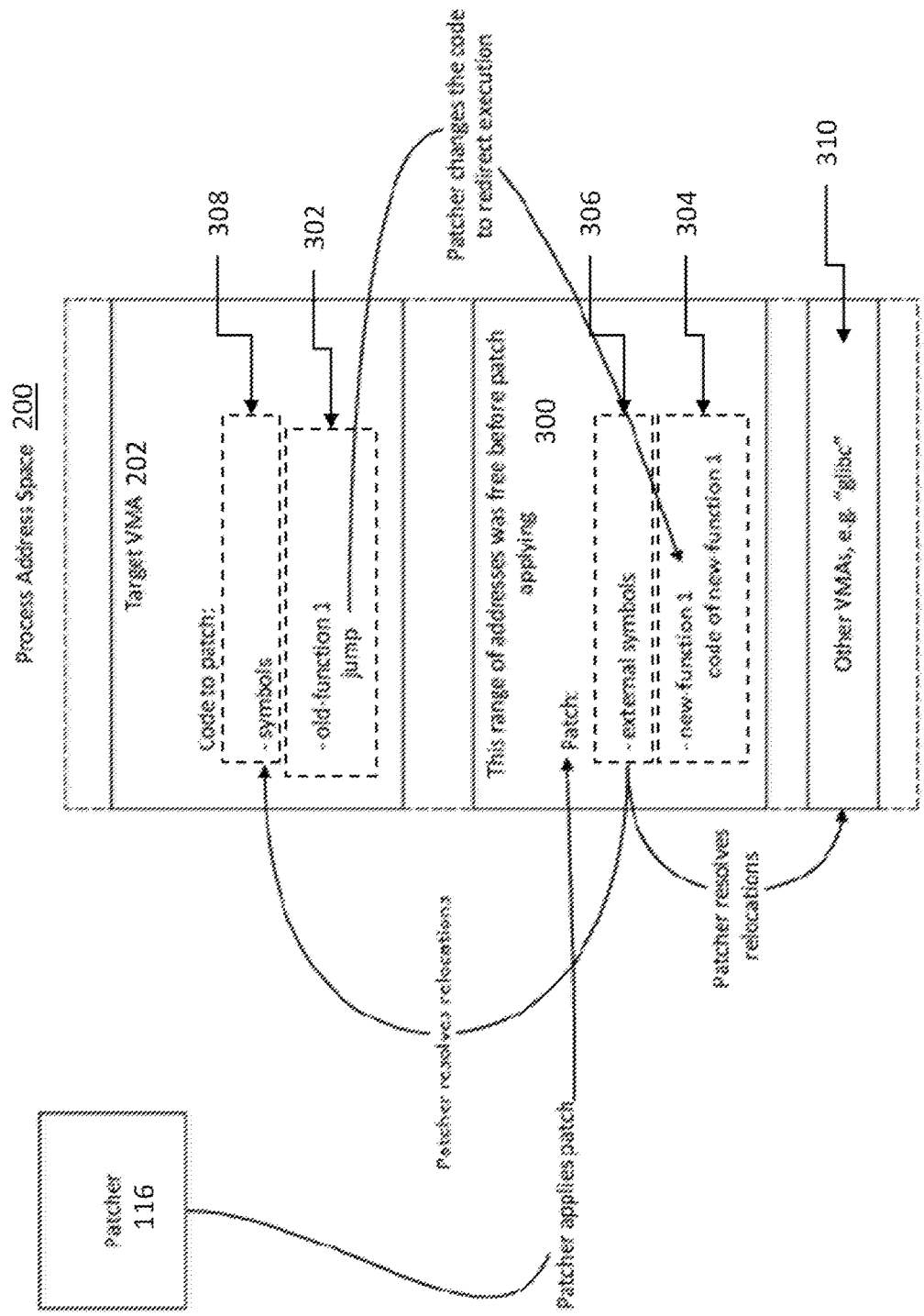
FIG. 3 illustrates the patch being applied in the process address space, and existing code being redirected to the patch code.

The applying of the instructions and/or metadata contained in binary file 115 as a patch to the application executing in process 146 is detailed with respect to FIG. 3. The original binary code 148 of the un-patched application is located in the Target VMA 202. The patcher 116 then links/attaches to the process 146 using any means that provides the ability to attach to the process, or gives read/write access to process's memory, e.g., a debugging interface. According to one aspect, the patcher may work outside of the process address space 200. According to another aspect, the patcher 116 may be started with special permissions and/or privileges required to read and write to executing processes on computer 140, for example "root" privileges in Unix-based computer systems.

In some aspects, the patcher 116 temporarily stops the process 146 and obtains direct access to the process 146. In one aspect of the disclosure, the patcher 116 may use "ptrace", debugging interface, "libCompel" library, or any similar interface to access the process 146. In some aspects of the disclosure, "libCompel" may be used to link to the process 146. After the process is temporarily stopped, the patcher 116 maps the binary file 115 to the address space of the process. The mapping is performed by the patcher 116 by loading the binary file 115 into address range 300 that was previously free prior to applying the patch.

In one aspect, the patcher 116 loads the instructions from the binary file 115 by injecting "parasite code" (also referred to as a "binary blob" in this disclosure) to the address space of the process 146. Instructions contained within the parasite code are executed on the computer 140 in the context of the process 146 by transferring execution from instructions in binary code 148 to the parasite code. The instructions in the parasite code load one or more portions of the contents of the binary file 115 into the address space 200. The patch (e.g., the instructions from binary file 115), according to one aspect, may be mapped to the process 146 (e.g., using the "mmap" system call or any of its analogues in any operating system), though other methods may be used. References in the memory mapping of the binary file 115 are then resolved by patcher 116 (e.g., without using a dynamic linker of the operating system; or, in other aspects, with the help of a dynamic linker of the operating system in case of references not referencing to 148 but to other shared objects).

The mapping of (e.g., special data structures, like relocations, contained in VMA corresponding to the binary file 115) the binary file 115 contains references to unresolved external symbols in section 306 (e.g., functions and variables) that are not defined in the modified source patch 108 (and similarly for binary file 115), but are defined in the original binary code 148 in code portion 308. Therefore, the patcher 116 may search for these external symbols in the binary code 148 and calculate their addresses using metadata in the mapping of the binary file 115. A symbol address for each of these symbols (or in other aspects, symbols having corresponding metadata in the patch) may be determined by adding a symbol offset stored in metadata and the address of the beginning of the Target VMA 202 or the base load address of binary code 148. In one aspect, the patcher 116 also links libraries and dependencies used in the patch, if not already linked to the process 146, and resolves binding symbols in the binary file 112.

The offset of symbols of the portion of code 308 may be stored in the metadata of the binary file 115 generated during the second instrumentation performed by generator 104. Each calculated symbol address is written into section 306 of the file mapping of the binary file 115, or to any appropriate place, for example a special data structure in the mapping, depending on the binary patch file format and the OS. In some aspects, the special data structure may be a global offset table when the binary patch is a shared object. If there is no metadata information in the binary file 115, the symbols are all external already and located in a dependency library, i.e., the symbols are not defined in the original binary code 148. In this case, the patcher 116 behaves similarly to a dynamic linker in an OS.

Usually programs that execute in user space use functions from dynamic libraries. To allow the programs to use dynamic libraries, a dynamic linker of the underlying operating system may resolve dependencies as follows, according to one aspect. A binary file that is executed on a computer, e.g., computer 140, contains a list of needed functions from different libraries. Normally, a dynamic linker finds these libraries and maps the libraries to the process address space (e.g., 200) when needed. While loading the binary of the program, the dynamic linker writes the address of some of the linker's resolver routines instead of the addresses of functions from the libraries that should be used by the binary later. These libraries are referred to as dependencies. Accordingly, when the first attempt to call a function, e.g. "printf", occurs in a binary, the dynamic linker is called instead of the original function. The dynamic linker finds a library containing the function "printf" (in some aspects, according to some priority algorithm) and writes the address of this function in the library to particular place in the mapping of the binary file. In this aspect, a conventional dynamic linker (e.g., an operating system linker) is not used to resolve symbols during patch application because "binding" symbols are internal for the program being patched. An OS dynamic linker will either not find the library containing the called function, or may find an incorrect library, making the patched program behavior unpredictable.

In one aspect, the code of such a binary file may be "position independent code", or PIC, where a real address of a function is not used when calling the function, but the address of a position in the code or data where the real address of the function will be written. While loading a dynamically linked binary, a dynamic linker attempts to find the address of the function and write the address in a portion of memory of the mapping of the binary file. Subsequently, an additional "jump" will occur with every call of the function, making aspects of the present disclosure applicable.

In some aspects, the patcher 116 may calculate the address in the process address space 200 of the "binding" symbol, and may write this address to the section 306 (particular data structure, e.g., global offset table) of the file mapping of binary file 115. In some aspects, the patcher 116 may calculate the real address in the process address space 200 of the static symbol, and may write this address to a global offset table of the binary patch. Accordingly, after applying a patch, any call to a particular external symbol (e.g., variable or function) in the address range 300 will be redirected to the code portion 308 in the original binary code 148.

According to one aspect, the patcher 116 resolves the links to symbols from libraries (in some aspect, for those symbols that do not have corresponding metadata in the patch) while the process 146 is temporarily stopped. In another aspect, the patcher uses the dynamic linker to resolve at least some of such symbols. In yet another aspect, the patcher 116 resolves the links during loading of the binary file 115 into the address range 300 through a dynamic linker, an underlying component used by the OS to resolve dependencies, only when the symbol is actually accessed from the context of the process address space 200.

The patcher 116 amends the binary code 148 to redirect execution of the program from the binary code 148 to the memory mapping of the binary file 115 and then links the binary file 115 with data in the process 146 as described above.

Using the above mentioned methods, the patcher 116 determines which part of the binary code 148 is being executed. Specifically, if the code currently being executed is the code that will be updated by the patch, then the patcher 116 waits until this code section is no longer being used to continue. In some aspects, such a check can be performed anywhere between steps 1-6 shown in FIG. 2.

As for the redirection, the patcher 116 amends the binary information (e.g. binary code 148) to allow redirecting execution (also referred to as transferring control) from the old code function, portion 302, to the new code fragment in portion 304 in the code loaded from binary file 115. The redirection of execution is performed, for example, by adding a "jump" or "call", or a the like, instruction in portion 302 in the very beginning of the old function or where the old function would have been called. The new code portion 304 is written such that execution flow is returned back to caller of the old function after the new function completes in portion 304 of binary code 148.

In some aspects, in order to perform the modification to the instructions in portion 302, the patcher 116 may switch the "context" of the process 146 so the patcher 116 can write to the address space of another process. In one aspect, the modification of the instructions can be performed by code inside the process 146, such as the parasite code that was used to load the binary file 115 to the address space of the process. In another aspect, the modification can be performed by another set of code executed from the context of the process 146, or from (for example) the patcher 116. In the case where the patcher 116 performs the modification, "ptrace" debug interface or the like, may be used that permits writing to any portion of memory of the stopped process.

Patcher 116 then releases the process 146, and the process 146 resumes execution. The process 146 is now live-patched in user space.

Figure 4:
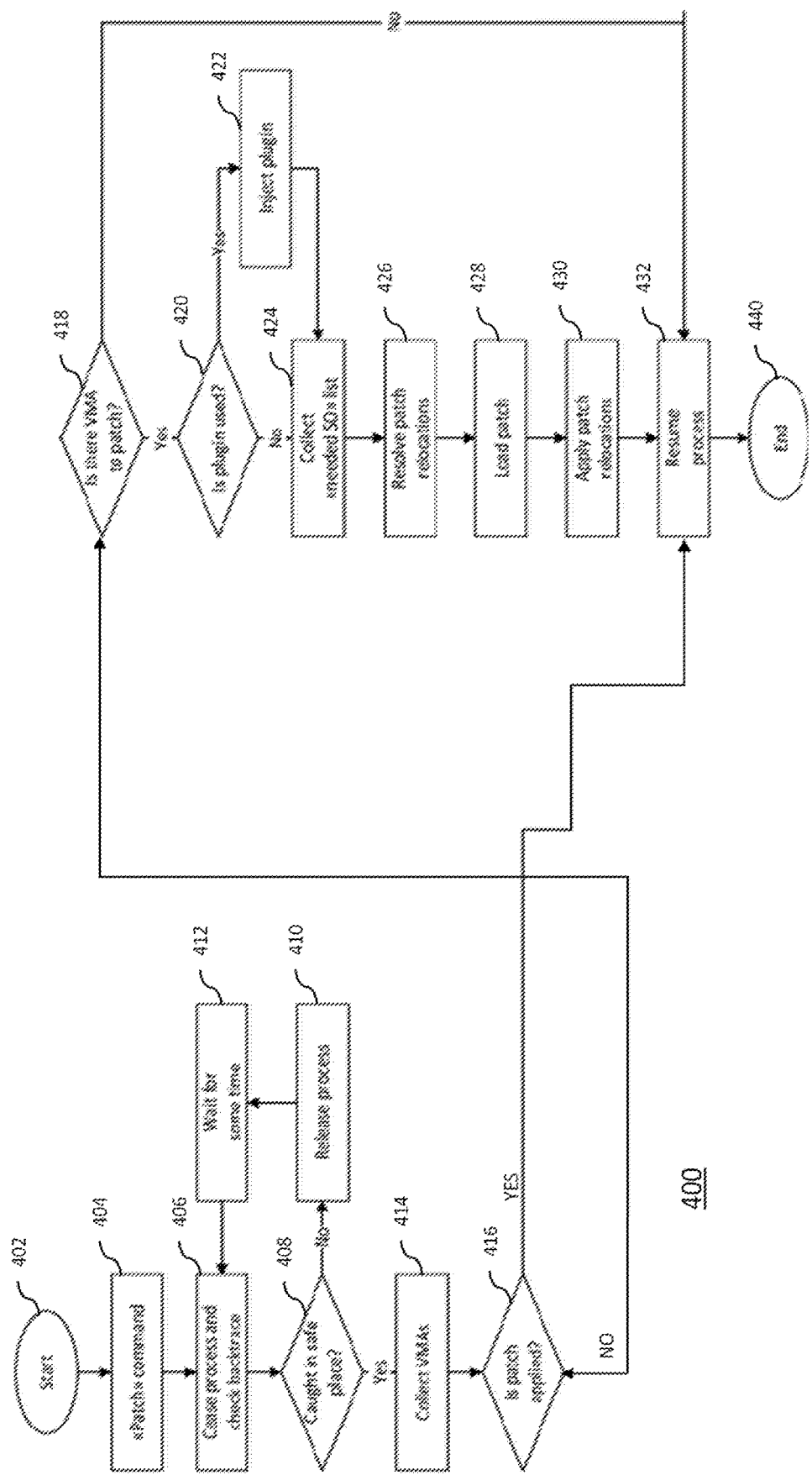
FIG. 4 is a flow diagram of a method for live-patching an executing process in user space in accordance with one aspect of the disclosure.

FIG. 4 is a flow diagram of a method 400 for live patching an executing process in user space in accordance with one aspect of the disclosure.

Figure 8:
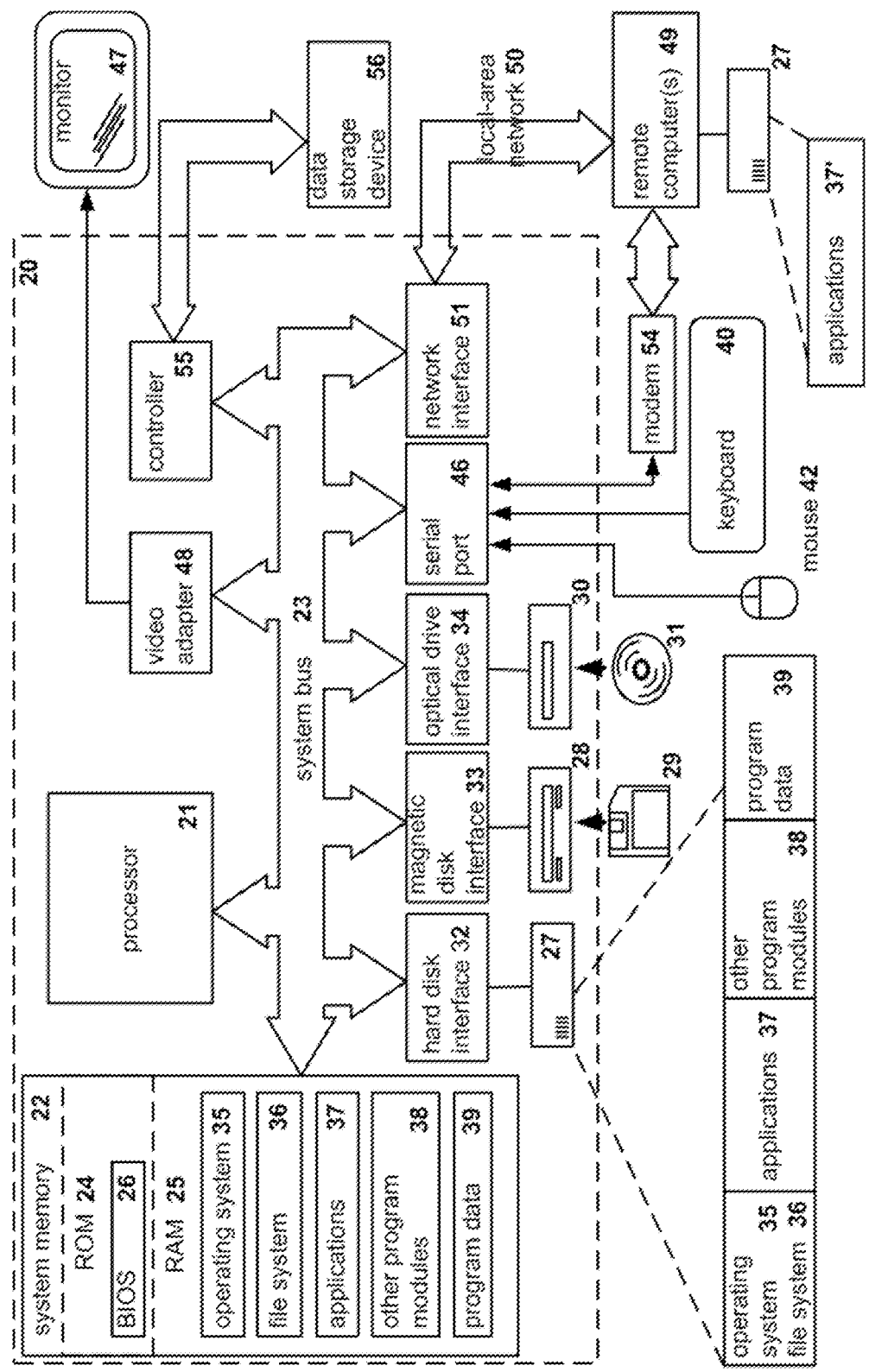
FIG. 8 illustrates a block diagram of a general-purpose computer system on which the disclosed system and method can be implemented according to an exemplary aspect.

Method 400 is one implementation of the patcher 116 according to exemplary aspects of this disclosure, as executed by processor 21 of computer system 20 shown in FIG. 8.

The method begins at step 402 and proceeds to 404 where patcher 116 receives the patch command.

At step 406, the patcher 116 ceases (e.g., temporarily "stops") the process to be patched, e.g., process 146.

At step 408, the patcher 116 determines whether the process has been caught in a safe place (for example, by examining the backtrace of the process), e.g., the process is not executing functions that should be replaced by the patch, and does not contain such functions in stack trace. In some aspects, the determination at 408 is performed in order to prevent old versions of functions from execution.

When the process is not stopped in a safe place, the method proceeds to step 410, where the process is released and the patcher 116 waits for a predetermined period of time at step 412 (or waits until such function will end) and returns to step 406. If at 408, the process is stopped at a safe place, the patcher 116 collects the virtual memory addresses of the process at 414.

If the patch has already been applied at 416, the method proceeds to step 432, where the process is resumed and the method ends at step 440.

However, if the patcher 116 determines that the patch has not been applied, the method proceeds to 418.

At 418, the patcher 116 determines whether there is a virtual memory area that contains code to be patched (i.e., a VMA that corresponds to a file containing binary code executed in process). If there is no VMA to patch, the method proceeds to 432 where the process 146 is resumed and the method terminates at 440.

However, if there is a VMA to patch, the method proceeds to another determination 420 to determine if a plugin is used. If a plugin is used, it is injected by patcher 116 at 422. The method then proceeds to 424, whether or not a plugin is used, and collects a list of "needed SO" or needed shared objects or needed dynamic libraries. In some aspects, the list is collected so that patcher 116 may determine which libraries are needed for the patch and may resolve external symbols imported from libraries in the patch.

At 426, the patcher 116 resolves the patch relocations as shown in FIG. 3.

The patcher 116 then loads the patch (e.g., the instructions and/or metadata contained in binary file 115) into the available VMA, e.g., address range 300 from FIG. 3 at 428. According to one aspect, loading the patch entails injecting the parasite code into the process address space 200 shown in FIG. 2, and mapping one or more portions from the binary file 115 into the address range 300 by parasite code.

Patch relocations are applied at 430 by the patcher 116. Patch relocations comprise relocations of any external symbols such as external symbols in section 306 in FIG. 3, to other VMAs or libraries such as "glibc" or the like. If an old method is being patched, jump or call instructions are inserted into the binary code of the process (e.g., binary code 148) to transfer control from the old function to the new function defined in the patch, and then to return to after the old function in portion 302 of FIG. 3.

At step 432, the process 146 resumes, patched entirely live with little to no downtime, within user space. The method terminates at 440.

Figure 5:
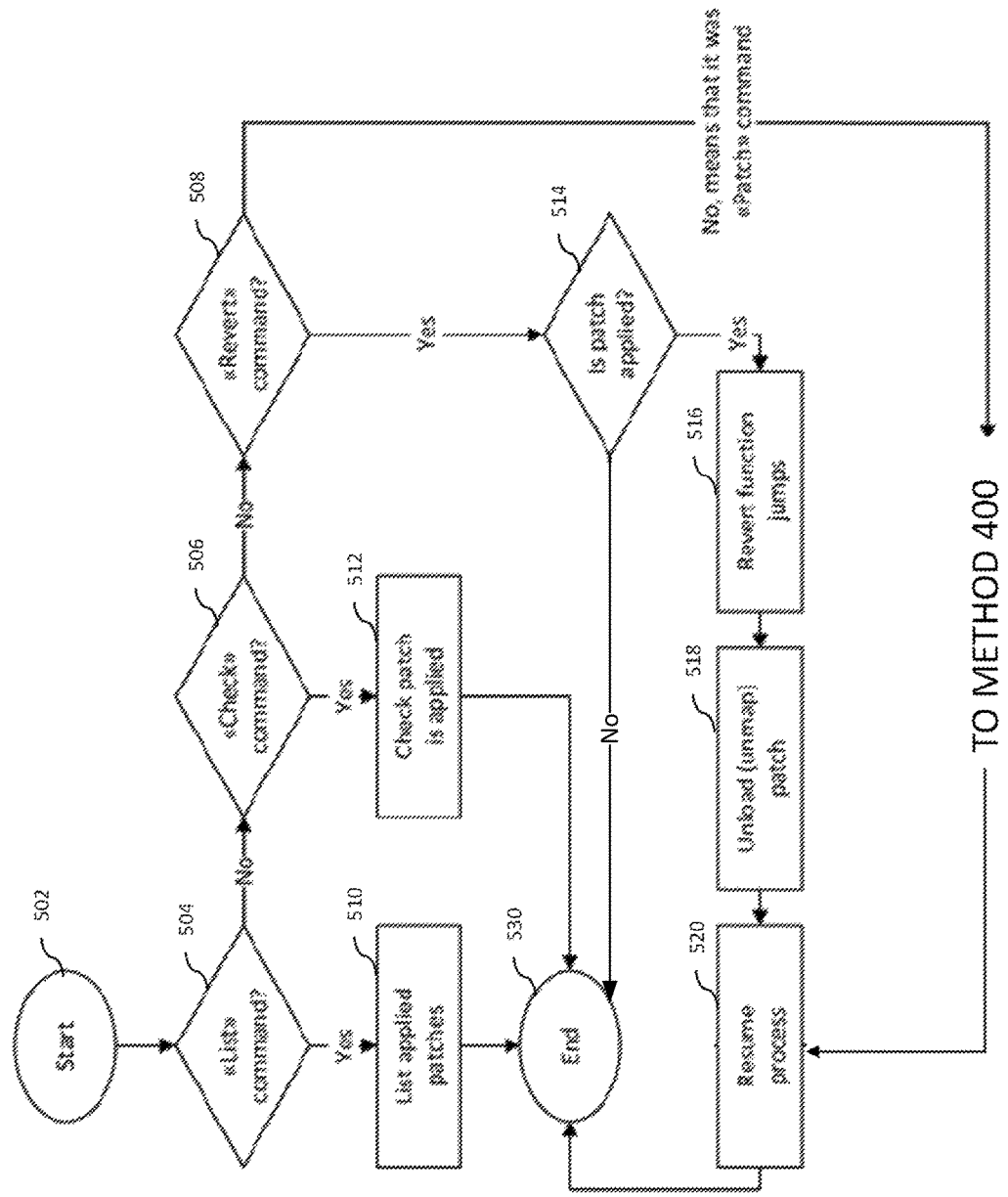
FIG. 5 is a flow diagram illustrating a method patching the process in accordance with another aspect of the disclosure.

FIG. 5 is a flow diagram illustrating a method 500 patching the process in accordance with another aspect of the disclosure. The patcher 116 is an exemplary implementation of the method 500 as executed on computer system 20 by CPU 21 shown in FIG. 8.

Method 500 begins at 502 and proceeds to 504, where the patcher 116 interprets commands and arguments, for example, from a command line, or other user interface. At 504, if the command is a "list" command, the method proceeds to 510 where applied patches are listed out by the patcher 116 via the user interface. The method terminates at 530.

At 506, if the command was a "check" command, the method proceeds to 512 where the patcher 116 determines if the patch has already been applied. The process terminates at 530.

At 508, if the patcher 116 does not receive a "revert" command, the patcher 116 has received a "patch" command, and the method proceeds to the steps of method 400 show in FIG. 4. Otherwise, the method 500 proceeds to 514. At 514, the patcher 116 determines whether the patch is applied, and if the patch is not applied, the method proceeds to 530 where the method terminates. Alternatively, after step 514, the method may proceed to 520 if the process was suspended prior to step 506, 508, 512 or 514; or suspends the process just before 516.

If the patch is applied at 514, the method proceeds to 516, where the control transfers performed in method 400 are reversed. The patch itself in address range 300 is unloaded (or, unmapped) at 518. Finally, the process 146 is resumed at 520 and the method terminates at 530.

FIG. 6 shows the details of the binary file 115, in accordance with one aspect of the disclosure. Binary file 115 may comprise binary code (from 112) that is compiled from modified source patch 108, and has first instrumentation applied. Binary file 112 may contain new functions that are new version of functions of the unpatched application.

Binary file 112 may also declare one or more symbols that are defined in the unpatched application, e.g., in the binary code 148 of process 146, but not defined in the binary file 112. For example, the binary file 112 identifies the symbol "symbol_2" as a binding symbol (e.g., global or/and external), indicating that during patching these may be resolved. Additionally, the binary file 115 may contain the metadata 600 that is added during the second instrumentation step performed by generator 104. For example, the metadata may contain information such as the offset of symbol_2 in the binary code 148.

Figure 7:
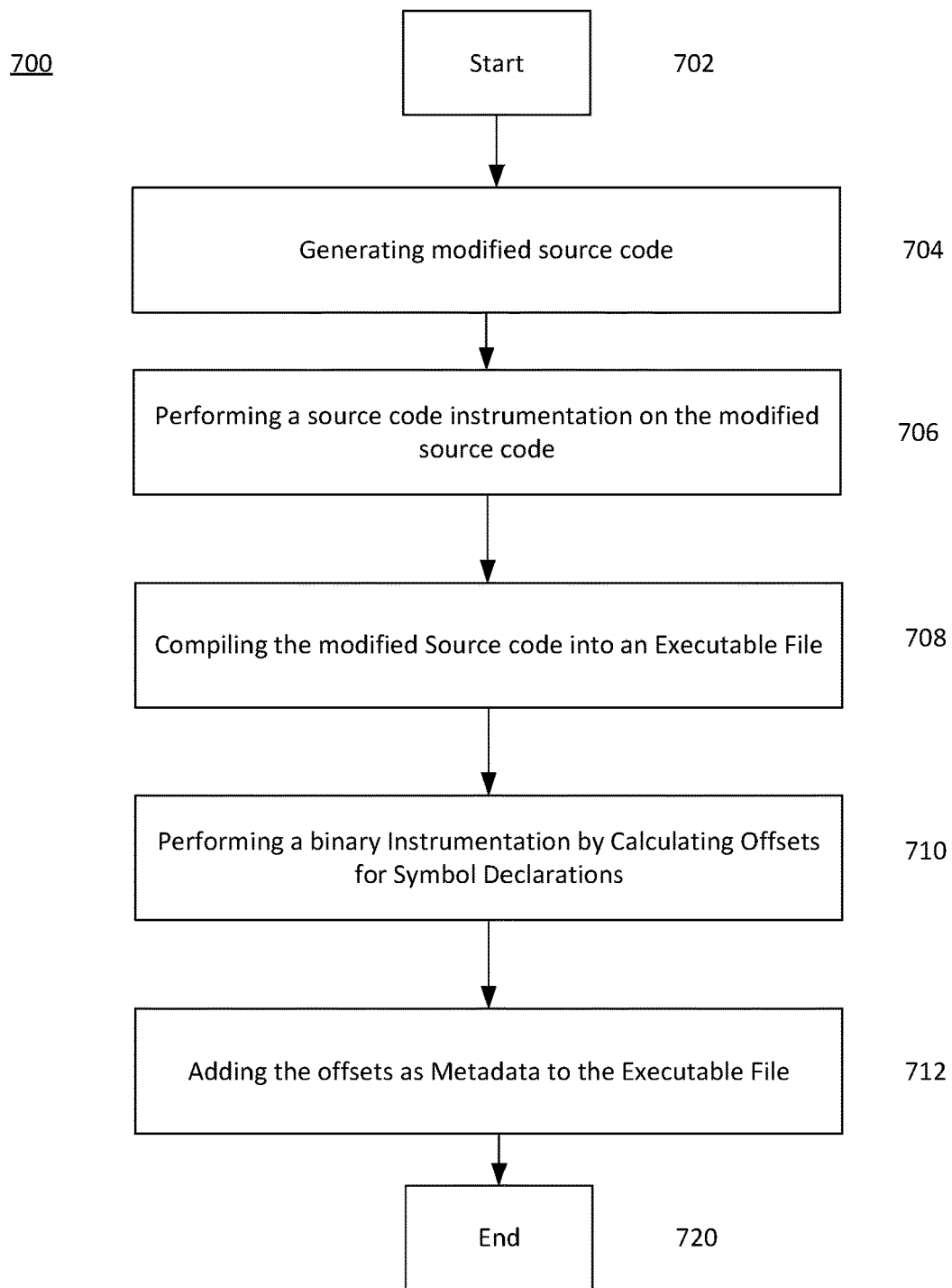
FIG. 7 is a flow diagram for a method for generating a binary patch in accordance with an aspect of the disclosure.

FIG. 7 is a flow diagram for a method 700 for generating a binary patch in accordance with an aspect of the disclosure.

The method 700 is an exemplary implementation of the generator 104 of system 100 shown in FIG. 1, as executed by a computer system such as system 20 shown in FIG. 8.

The method begins at 702 and proceeds to 704. At 704, the generator 104 may generate modified source code containing changed function by identifying differences between un-patched source code of an application and a patched version of the application. The modified source code comprises at least definitions of changed or new functions and declarations of or references to the symbols that are used in the patch, but are not defined there.

At 706, a source code instrumentation is performed to declare a portion of the symbols in the modified source code as global and/or external.

At 708, the generator 104 may invoke a compiler to compile the modified source code into an executable file, e.g. binary file 112.

At 710, the generator 104 performs a binary instrumentation by calculating offsets for the symbols in the binary code 148 as described with respect to FIGS. 1-4 and 6.

Finally, at 712, the generator 104 includes the offsets as metadata to the binary file forming the binary patch. The method terminates at 720. In some aspects, portions of method 700 may be optional, such as steps 704-708, in which case the modified source code is already generated and/or a compiled version of the modified source code is received at the generator 104.

FIG. 8 illustrates a block diagram of a general-purpose computer system on which the disclosed system and method can be implemented according to an exemplary aspect. It should be noted that the computer system 20 can correspond to the computer 140, or computers that execute the generator 104 and patcher 116.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a binary patch file for live patching of an application comprising:
   creating a shared object by compiling a source code patch file,
   wherein the source code patch file contains:
      source code of at least one new function corresponding to at least one old function in an application binary code,
      at least one global external symbol referenced in the source code of the at least one new function, and
      at least one link to at least one symbol in the application binary code corresponding to the at least one global external symbol, wherein the at least one link contains information about at least one definition of the at least one symbol in the application binary code;
   wherein, the shared object contains:
      binary code of the at least one new function usable to replace the at least one old function during the live patching of the application, and
      a result of a compilation of the at least one link, wherein the result include binary data describing the at least one definition of the at least one symbol;
   generating metadata, usable to facilitate the live patching of the application, by:
      calculating a relative address for each of the at least one symbol in the application binary code,
      using debug information of the application binary code, and
      using the binary data describing the at least one definition of the at least one symbol;
      in metadata, creating bindings between the calculated relative addresses and the at least one global external symbol referenced by the shared object; and
      creating the binary patch file by adding metadata to the shared object.

2. The method of claim 1, wherein a symbol of the at least one global external symbol or the at least one symbol in the application binary code comprises a variable or a function.

3. The method of claim 1, wherein the shared object references the at least one global external symbol.

4. The method of claim 1, wherein the compilation of the at least one link is performed by invoking a compiler to compile the source code of the at least one new function to create an executable file.

5. The method of claim 1, wherein the usage of the debug information of the application binary code comprises: verifying types and sizes of symbols in the source code patch file and the binary patch file.

6. The method of claim 1, wherein the creating of the binary patch file comprises:
   receiving a list of architectures using the application; and
   generating, for each architecture in the list, a patch for the application.

7. The method of claim 1, wherein the created binary patch file is usable in user space.

8. A system for generating a binary patch file for live patching of an application, the system comprising:
   a combination of one or more processors configured to:
      create a shared object by compiling a source code patch file,
      wherein the source code patch file contains:
         source code of at least one new function corresponding to at least one old function in an application binary code,
         at least one global external symbol referenced in the source code of the at least one new function, and
         at least one link to at least one symbol in the application binary code corresponding to the at least one global external symbol, wherein the at least one link contains information about at least one definition of the at least one symbol in the application binary code;
      wherein, the shared object contains:

binary code of the at least one new function usable to replace the at least one old function during the live patching of the application, and a result of a compilation of the at least one link, wherein the result include binary data describing the at least one definition of the at least one symbol;

generate metadata, usable to facilitate the live patching of the application, by:

calculating a relative address for each of the at least one symbol in the application binary code, using debug information of the application binary code, and using the binary data describing the at least one definition of the at least one symbol;

in metadata, create bindings between the calculated relative addresses and the at least one global external symbol referenced by the shared object; and create the binary patch file by adding metadata to the shared object; and a patcher configured to:

use the created binary patch file for the live patching.

9. The system of claim 8, wherein a symbol of the at least one global external symbol or the at least one symbol in the application binary code comprises a variable or a function.

10. The system of claim 8, wherein the shared object references the at least one global external symbol.

11. The system of claim 8, wherein the compilation of the at least one link is performed by invoking a compiler to compile the source code of the at least one new function to create an executable file.

12. The system of claim 8, wherein the usage of the debug information of the application binary code comprises: verifying types and sizes of symbols in the source code patch file and the binary patch file.

13. The system of claim 8, wherein the configuration to create the binary patch file comprises a configuration for:

receiving a list of architectures using the application; and generating, for each architecture in the list, a patch for the application.

14. The system of claim 8, wherein the created binary patch file is usable in user space.

15. A non-transitory computer-readable medium storing therein instructions for executing a method generating a binary patch file for live patching of an application, the instructions comprising instructions for:

creating a shared object by compiling a source code patch file, wherein the source code patch file contains:

source code of at least one new function corresponding to at least one old function in an application binary code, at least one global external symbol referenced in the source code of the at least one new function, and at least one link to at least one symbol in the application binary code corresponding to the at least one global external symbol, wherein the at least one link contains information about at least one definition of the at least one symbol in the application binary code;

wherein, the shared object contains:

binary code of the at least one new function usable to replace the at least one old function during the live patching of the application, and a result of a compilation of the at least one link, wherein the result include binary data describing the at least one definition of the at least one symbol; generating metadata, usable to facilitate the live patching of the application, by:

calculating a relative address for each of the at least one symbol in the application binary code, using debug information of the application binary code, and using the binary data describing the at least one definition of the at least one symbol;

in metadata, creating bindings between the calculated relative addresses and the at least one global external symbol referenced by the shared object; and creating the binary patch file by adding metadata to the shared object.

16. The non-transitory computer-readable medium of claim 15, wherein a symbol of the at least one global external symbol or the at least one symbol in the application binary code comprises a variable or a function.

17. The non-transitory computer-readable medium of claim 15, wherein the shared object references the at least one global external symbol.

18. The non-transitory computer-readable medium of claim 15, wherein the compilation of the at least one link is performed by invoking a compiler to compile the source code of the at least one new function to create an executable file.

19. The non-transitory computer-readable medium of claim 15, wherein the usage of the debug information of the application binary code comprises: verifying types and sizes of symbols in the source code patch file and the binary patch file.

20. The non-transitory computer-readable medium of claim 15, wherein the instructions for creating of the binary patch file comprise instructions for:

receiving a list of architectures using the application; and generating, for each architecture in the list, a patch for the application.

21. The non-transitory computer-readable medium of claim 15, wherein the created binary patch file is usable in user space.

* * * * *